(12) United States Patent
Miller et al.

(10) Patent No.: US 10,895,507 B2
(45) Date of Patent: Jan. 19, 2021

(54) METHOD FOR SPATIALLY-LOCALIZED GAS-PHASE TEMPERATURE MEASUREMENTS THROUGH CERAMIC MATERIALS

(71) Applicant: Government of the United States as Represented by the Secretary of the Air Force, Wright-Patterson AFB, OH (US)

(72) Inventors: Joseph D. Miller, Bellbrook, OH (US); Zhili Zhang, Knoxville, TN (US); Yue Wu, Knoxville, TN (US); Mark Gragston, Knoxville, TN (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 236 days.

(21) Appl. No.: 16/004,184

(22) Filed: Jun. 8, 2018

(65) Prior Publication Data

US 2018/0356292 A1 Dec. 13, 2018

Related U.S. Application Data

(60) Provisional application No. 62/516,786, filed on Jun. 8, 2017.

(51) Int. Cl.
*G01J 5/00* (2006.01)
*G01K 1/00* (2006.01)
(Continued)

(52) U.S. Cl.
CPC .............. *G01J 5/36* (2013.01); *F01D 25/005* (2013.01); *F23N 5/00* (2013.01); *F23N 5/265* (2013.01);
(Continued)

(58) Field of Classification Search
USPC ................................ 374/141, 122, 121, 208
See application file for complete search history.

(56) References Cited

U.S. PATENT DOCUMENTS 7,560,869 B2 7/2009 Miles et al.
7,728,295 B2 6/2010 Miles et al.
(Continued)

OTHER PUBLICATIONS

H Mori et al., "Spectroscopic study of REMPI for rotational temperature measurement in highly rarefied gas flows," Rarefied Gas Dynamics: 22nd Int'l Symp (2001) 956-963.
(Continued)

*Primary Examiner* — Mirellys Jagan
(74) *Attorney, Agent, or Firm* — AFMCLO/JAZ; Chastity D. S. Whitaker

(57) ABSTRACT

A method of measuring a temperature of a thermally-insulated, high temperature system. The method includes directing a first electromagnetic energy into the high temperature system so that the first electromagnetic energy may cause multi-photon ionization of a molecular or atomic species within the high temperature system. A second electromagnetic energy resulting from the multi-photon ionization is detected through a thermally-insulating wall of the high temperature system. The detected second electromagnetic energy is related to a temperature within the high temperature system.

15 Claims, 18 Drawing Sheets
(1 of 18 Drawing Sheet(s) Filed in Color)

(51) Int. Cl.
  *G01J 5/36* (2006.01)
  *G01J 5/60* (2006.01)
  *F23N 5/26* (2006.01)
  *F23N 5/00* (2006.01)
  *F01D 25/00* (2006.01)

(52) U.S. Cl.
  CPC ............. *G01J 5/0014* (2013.01); *G01J 5/601* (2013.01); *F23N 2225/08* (2020.01)

(56) References Cited

U.S. PATENT DOCUMENTS

| | | |
|---|---|---|
| 8,742,363 B2 | 6/2014 | Munchmeyer et al. |
| 8,884,181 B2 | 11/2014 | Houde et al. |
| 9,030,667 B2 | 5/2015 | Tanriverdi |
| 9,153,423 B2 | 10/2015 | Beil et al. |
| 2015/0022815 A1 | 1/2015 | Ismail |
| 2015/0129760 A1 | 5/2015 | Beil et al. |
| 2017/0356879 A1 | 12/2017 | Brechtel et al. |

OTHER PUBLICATIONS

S. F. Adams et al., "Oxygen rotational temperature determination using empirical analysis of C3Pi(v'=2) from X3Signam(v"=0) transitions, "Appl. Spectroscopy, vol. 69 (2015) 1036-1041.

Y Wu et al., "Flame temperature measurements by radar resonance enhanced multiphoton ionization of molecular oxygen," Appl. Optics, vol. 51 (2012) 6864-6869.

Y. Wu et al., "O2 rotational temperature measurements by coherent microwave scattering from REMPI," Chem. Phys. Lett, vol. 513 (2011) 191-194.

J. Sawyer et al., "O2 rotational temperature measurements in an atmospheric air microdischarge by radar resonance enhanced multiphoton ionization," J. Appl. Phys., vol. 113 (2013) 233304, 6 pages total.

10,895,507 B2

METHOD FOR SPATIALLY-LOCALIZED GAS-PHASE TEMPERATURE MEASUREMENTS THROUGH CERAMIC MATERIALS

Pursuant to 37 C.F.R. § 1.78(a)(4), this application claims the benefit of and priority to prior filed Provisional Application Ser. No. 62/516,786, filed 8 Jun. 2017, the disclosure of which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to thermal measurements and, more particularly, to high temperature thermal measurements.

BACKGROUND OF THE INVENTION

Measurements of gas-phase temperature are critical for understanding fluid transport, heat transfer, and chemical reactions in power generation and propulsion systems (such as ground-based gas turbines and aircraft engines). Typically, combustion-based power generation systems operate at pressures and temperatures significantly above ambient conditions and require specialty high-temperature materials for confining the combusting flow. Thermally-insulating materials, such as ceramic coatings and (more recently) ceramic-matrix composites, are used to extend the high temperature operational limit of these systems. In fact, ceramic materials are commonly used in high-temperature, industrial chemical reactors and furnaces. In each of these applications, accurate gas-phase temperature measurements are required to optimize the thermochemical processes and to provide monitoring for process control and feedback.

Two primary issues limit the effectiveness of thermometry techniques under these conditions: (1) probe-based measurements are physically invasive and (2) non-invasive, optical measurements require significant optical access. Probe-based measurement techniques require materials comprising the probe to survive harsh high-temperature environments, and such probes can significantly impact the thermochemical process. Examples of such conventional probes include ceramic-insulated thermocouples, gas-dynamic probes, and species-based extractive sampling probes. Optical-based measurement techniques lead to heat loss through the optical access or provide spatially integrated measurements. Examples of optical probes include coherent anti-Stokes Raman scattering, laser-induced grating spectroscopy, Rayleigh scattering, tunable diode laser absorption spectroscopy, and IR thermal imaging.

As such, there remains a need for improved devices and methods of measuring the temperature of high temperature gas systems.

SUMMARY OF THE INVENTION

The present invention overcomes the foregoing problems and other shortcomings, drawbacks, and challenges of conventional devices and methods for measuring temperature of high temperature gas systems. While the invention will be described in connection with certain embodiments, it will be understood that the invention is not limited to these embodiments. To the contrary, this invention includes all alternatives, modifications, and equivalents as may be included within the spirit and scope of the present invention.

According to an embodiment of the present invention, a method of measuring a temperature of a thermally-insulated, high temperature system that includes directing a first electromagnetic energy into the high temperature system so that the first electromagnetic energy may cause multi-photon ionization of a molecular or atomic species within the high temperature system. A second electromagnetic energy resulting from the multi-photon ionization is detected through a thermally-insulating wall of the high temperature system. The detected second electromagnetic energy is related to a temperature within the high temperature system.

Other embodiments of the present invention are directed to a method of measuring a temperature of a thermally-insulated, high temperature system that includes directing a first electromagnetic energy into the high temperature system so that the first electromagnetic energy may cause multi-photon ionization of a molecular or atomic species at a first position within the high temperature system. A second electromagnetic energy resulting from the multi-photon ionization at the first position is detected through a thermally-insulating wall. The first electromagnetic energy is then directed into the high temperature system so that the first electromagnetic energy may cause multi-photon ionization of a molecular or atomic species at a second position within the high temperature system. A third electromagnetic energy resulting from the multi-photon ionization at the second position is detected through a thermally-insulating wall. The detected second and third electromagnetic energies are related to temperatures at first and second positions, respectively within the high temperature system.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
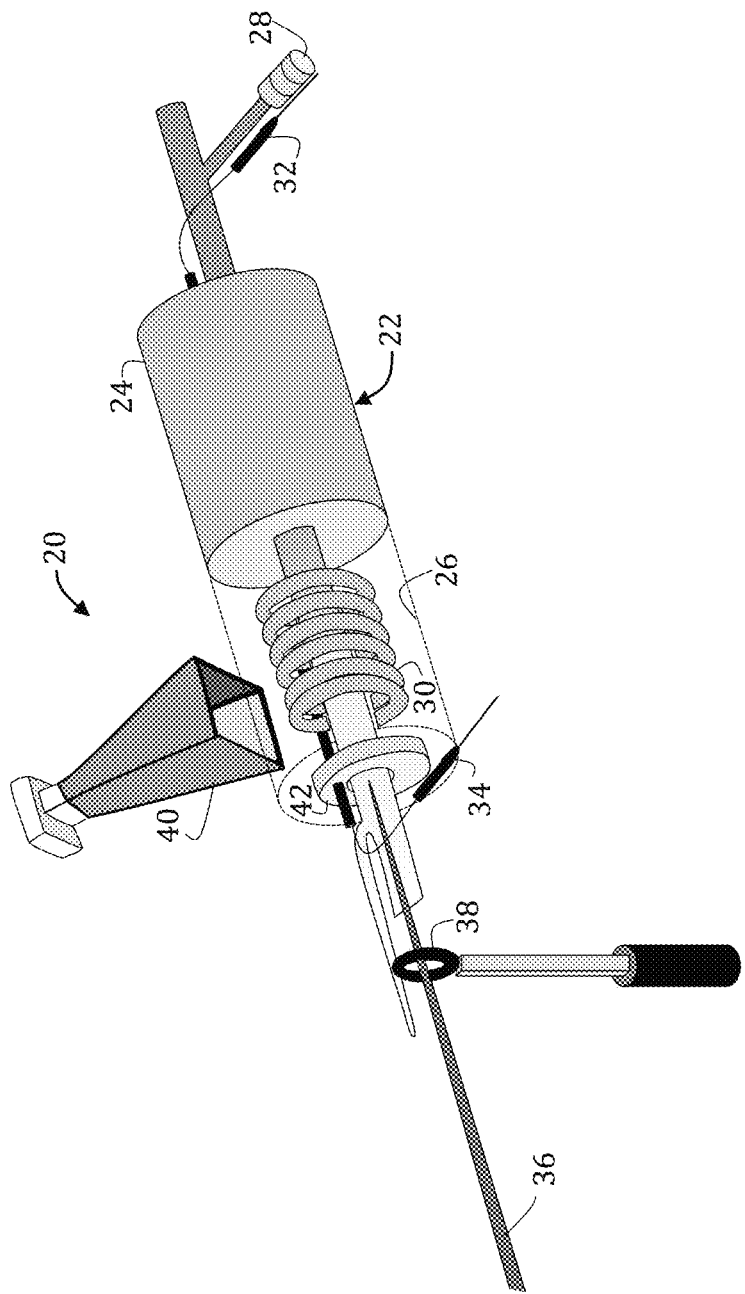
FIG. 1 is a perspective view of a radar-based REMPI temperature measurement system according to an embodiment of the present invention as used with a flow reactor.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the present invention overcome the limitations imposed by conventional gas-phase thermometry methods while enabling highly accurate, spatially localized measurements with minimal optical access requirements and, thus, are suitable for application in ground-based gas turbines, aircraft engines, industrial furnaces, and high-temperature chemical reactors. Generally, laser-based resonance-enhanced multi-photon ionization ("REMPI") is used to probe $N_2$, $O_2$, other combustion-relevant species, or combinations thereof with species-specific ultraviolet excitation through a small access port (less than about 5 mm diameter). Unlike conventional methods requiring optical access to collect emitted light from the multi-photon ionization process (e.g., laser-induced breakdown spectroscopy with greater than 50 mm access requirements), electron density of the REMPI process may be probed using microwave radiation ("radar"). The primary advantage of using radar to probe the REMPI process is that microwaves can transmit through optically-opaque ceramic insulators and ceramic-matrix composites with minimal attenuation. Such characteristics enable high signal-to-noise ratio measurements in highly confined combustors and reactors that would otherwise not accommodate conventional optical thermometry techniques. The radar-based REMPI signal may then be related to temperature through the Boltzmann distribution on energy states with high accuracy. While radar-based REMPI has previously been demonstrated for gas-phase temperature measurements, the unique aspect of embodiments of the present invention is an ability to make the measurement through ceramic walls in a non-invasive nature by radar detection without sacrificing accuracy, precision, or spatial resolution.

Additional detail regarding certain embodiments of the present invention is provided in Y. W U et al., "Spatially localized, see-through-wall temperature measurements in a flow reactor using radar REMPI," Optics Letters, Vol. 42 (2017) 53-56. The details of this paper are incorporated herein by reference, in its entirety.

Referring now to the figures, and in particular to FIGS. 1-4, a radar-based REMPI system 20 suitable for use in measuring a temperature within a ceramic reactor 22, such as a flow reactor or a jet-stirred reactor having walls 24 or including an insulator (not shown) constructed of a ceramic material. Generally, radar-based REMPI system 20 may be used to measure temperature in both reacting and non-reacting environments via microwave scattering off electrons freed from molecules or atoms by photonic absorption.

As shown in FIG. 1, the ceramic reactor 22 is a flow reactor that includes a ceramic wall 24 encircling a reaction chamber 26. A reactant inlet 28 having fluid communication with the reaction chamber 26 is provided and through which one or more reactants may be pumped or otherwise directed into the reaction chamber 26. The ceramic wall 24 may be constructed of any suitable ceramic material or ceramic composite. Exemplary ceramic materials may include but are not limited to including TEFLON, aluminum oxide ($Al_2O_3$), silica dioxide ($SiO_2$) and silicon carbide (SiC), and silicon nitride ($Si_3N_4$).

The ceramic reactor 22 also includes a heater 28, which is illustrated here as a plasma lighting coil; however, other heaters may also be used. One or more thermocouples 32, 34 may be operably coupled the ceramic reactor 22 so to as measure, monitor, or adjust a temperature within the reaction chamber 26.

The radar-based REMPI system of FIG. 1 includes an electromagnetic source that is configured to excite photonic absorption for the measured species as described in detail below. While the electromagnetic source is not shown in FIG. 1, for purposes of illustration an electromagnetic energy emitted therefrom is shown in an exemplary embodiment as a pulsed, ultraviolet ("UV") laser beam 36, such as could be generated via second harmonic generation of an Nd:YAG-pumped tunable dye laser. One of ordinary skill in the art having the benefit of the disclosure made herein would readily appreciate that the electromagnetic energy used to excite photonic absorption may vary and not necessarily be UV. In fact, other ranges of the electromagnetic spectrum may be used (visible spectrum, infrared, and so forth) and will depend on the energy necessary to effectuate photonic absorption. While the type of frequency and pulse parameters may vary with embodiments and application, for purposes of the exemplary embodiment, a pulse repetition rate of 10 Hz is used. The wavelength may be continuously tunable from 284 nm to 289 nm with a linewidth of 1 cm'. Automatic tracking ("autotracking") may be used with second harmonic generation to ensure maximum conversion efficiency and minimal spatial movement as the wavelength was scanned. The beam 36 may be focused prior to entering the ceramic reactor 22. For example, in FIG. 1 the beam 36 is focused by a +150 mm spherical lens 38 to a volume with diameter of 100 μm (estimated beam waist) and length of about 2 mm.

A size of a measured volume is generally significantly smaller than an internal volume of the reaction chamber 22 in which the temperature is to be measured. Minimizing the measured volume enables temperature and species measurements in both radial and axial directions. The axial and radial spatial resolution is estimated as 2 mm and 100 respectively, and may be varied by changing the focal length of the lens 38 or the diameter of the laser beam 36 on the lens 38.

The radar-based REMPI system 20 further comprises a microwave horn 40, such as a homodyne detection system, that is configured to transmit and receive microwaves. In particular, the microwave horn 40 should be configured to receive microwaves scattered from ionized reactants within the reactor chamber 22 without need for optical access thereto. Details of a suitable homodyne detection system would be understood by those skilled in the art and are not necessarily illustrated herein. Briefly, and by way of example, a tunable microwave source (such as a 12 dBm, HP 8350B sweep oscillator) may be separated into two channels: a first channel that is configured to radiate plasma using the microwave horn (WR75, 15 dB gain), which may also be used to collect microwaves scattered by a plasma generated within the reaction chamber 22; and a second channel configured as a local oscillator (a reference signal) for the frequency mixer. Microwave scatter received by the horn 40 from within the reaction chamber 22 transmits through the ceramic walls 24 and may be, optionally, passed through a microwave circulator to amplify the signal using a preamplifier (for example, by 30 dB at about 10 GHz or may be converted down in the mixer, two other amplifiers with bandwidth of 2.5 kHz to 1.0 GHz amplified the signal by 60 dB). The resultant signal may be optionally monitored, recorded, or both, such as by using an oscilloscope. Additionally, or alternatively, the oscilloscope may be used to monitor the laser beam.

An orientation of the microwave horn 40 may be selected to maximize signal reception of the signal from the plasma within the reaction chamber 22 while accounting for the geometry of dipole radiation.

Referring still to FIG. 1, a method of measuring temperature according to embodiments of the present invention is described. In essence, microwaves generated by scattered electrons freed from molecules or atoms within an ignited plasma within the reaction chamber 22 by photonic absorption (such as by a 2+1 multiphoton excitation process) are detected. More particularly, and using molecular oxygen as an illustrative example, a ground state of molecular oxygen, $O_2(X^3\Sigma)$ may be suitably described by Hund's case (b)—that is having strong electrostatic coupling, weak to non-existent spin-orbit coupling, and intermediate rotational coupling. Other molecular or atomic species may be used, such as nitrogen gas or nitric oxide gas, to name a few. As a result of hyperfine splitting, the ground state is a triplet with rotational energies of:

$$G_1 = B_v J(J+1) - D_v J^2(J+1)^2 + (2J+3)B_v - L - \sqrt{(2J+3)^2 B_v^2 + L^2 - 2LB_v} + G(J+1)$$

$$G_2 = B_v J(J+1) - D_v J^2(J+1)^2$$

$$G_3 = B_v J(J+1) - D_v J^2(J+1)^2 + (2J+3)B_v - L - \sqrt{(2J+3)^2 B_v^2 + L^2 - 2LB_v} + GJ$$

Equation 1 wherein Bv is the rotational energy constant, Dv is the distortional energy constant, J is angular momentum, and L is the electronic orbital angular momentum.

An excited state of molecular oxygen, that is after a multiphoton excitation process within the plasma, $O_2(C^3\Pi$ (v=2)), follows Hund's case (a)—that is having strong electrostatic coupling, intermediate spin-orbit coupling, and weak rotational coupling. Hyperfine splitting results in energy levels given by Equation 2:

$$F_1(\Omega=0) = n_{01} + B_{eff1} J(J+1) - D_{v1} J^2(J+1)^2$$

$$F_2(\Omega=1) = n_{01} + B_{eff2} J(J+1) - D_{v2} J^2(J+1)^2$$

$$F_3(\Omega=2) = n_{03} + B_{eff3} J(J+1) - D_{v3} J^2(J+1)^2$$

Equation 2

The constants $n_0$, $B_{eff}$, and $D_v$ of Equation 2 are available in literature.

Because of the hyperfine structure of radar-based REMPI spectra, each branch (that is, the O, P, Q, R and S branches corresponding to various excited states of the molecule under investigation) may have multiple lines. Thus, a two-photon transition line strength, $S_{fg}^{(2)}$, between the excited state, $C^3\Pi$, and the ground state, $X^3\Sigma$, may be given by:

$$S_{fg}^{(2)} = \sum_{k=0,2} \frac{|\beta_k^{(2)}|^2}{2k+1} (2J+1)(2J'+1)(2N'+1) \times \begin{bmatrix} J' & S & N' \\ \Lambda'+\Sigma & -\Sigma & -\Lambda' \end{bmatrix}^2 \begin{bmatrix} J & k & J' \\ \Omega & -\Delta\Lambda & -\Lambda'-\Sigma \end{bmatrix}^2$$

Equation 3 where $\beta_k^{(2)}$ is the polarization coefficient, J is the rotational quantum number, and the brackets, [ . . . ], denote the Wigner 3-j symbol. For the ground state, $X^3\Sigma$, $\Lambda' = 0$, and $\Sigma' = \pm 1,0$; for the excited state, $C^3\Pi$, $\Lambda = 1$, $\Sigma = \pm 1,0$, and $\Omega = 0,1,2$. For linearly polarized light: $\beta_k^{(2)} = \sqrt{10}/3$, and for circular polarization: $\beta_k^{(2)} = \sqrt{5}$. Furthermore, for circular polarization only the k=2 term contributes.

When the radar REMPI system 20 is used for $O_2$ rotational temperature measurements of the illustrative embodiment, the Sit branch may be suitable for temperatures less than 700 K. The wavelengths, rotational ground state energies, and line strengths calculated using Equations 1-3 for the $S_{21}$ branch lines are provided in Table 1, below.

TABLE 1

| Wavelength (nm) | J' | $G_1$ (cm$^{-1}$) | $S_{fg}^{(2)}$ |
|---|---|---|---|
| 286.65 | 17 | 440.49 | 10.72 |
| 286.78 | 15 | 345.79 | 9.72 |
| 286.88 | 13 | 262.54 | 8.71 |
| 286.99 | 11 | 190.74 | 7.70 |
| 287.09 | 9 | 130.42 | 6.69 |
| 287.18 | 7 | 81.57 | 5.66 |

TABLE 1-continued

| Wavelength (nm) | J' | $G_1$ (cm$^{-1}$) | $S_{fg}^{(2)}$ |
|---|---|---|---|
| 287.26 | 5 | 44.20 | 4.62 |
| 287.34 | 3 | 18.33 | 3.50 |

The radar-based REMPI microwave signal, $E_{MW}$, resulting from the scattering of microwaves on the plasma is proportional to electron density, $N_e$, which is related to the number of molecules completing the 2+1 ionization process. This proportionality is expressed in Equation 4:

$$E_{MW} \propto N_e = N_0 S_{fg}^{(2)} I^3 \sigma_i \exp\left(-\frac{E_g}{k_B T}\right) \quad \text{Equation 4}$$

wherein I is the intensity of the exciting pulse (here, the UV laser beam), $\sigma_i$ is the ionization cross-section from the excited state, $E_g$ is the ground state energy, T is temperature, and $k_B$ is the Boltzmann constant. Because multiple emission lines are available, Equation 4 may be arranged such that temperature may be determined from a linear plot, with the assumption that $S_{fg}^{(2)}$ is constant over the scanning wavelength range:

$$\ln\left(\frac{E_{MW}}{I^3 S_{fg}^{(2)}}\right) \propto -\frac{E_g}{k_B T} \quad \text{Equation 5}$$

Figure 2:
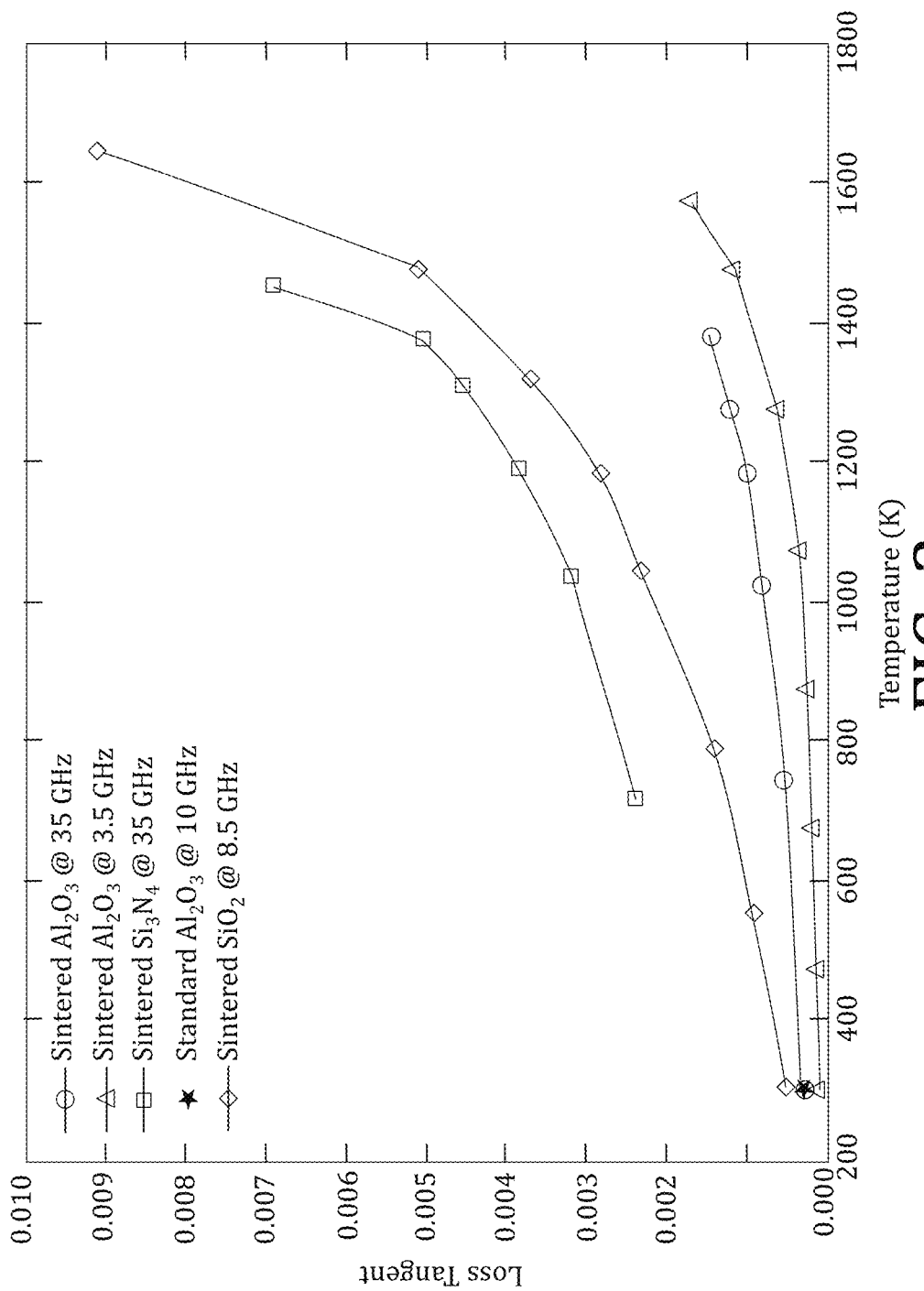
FIG. 2 is a graphical representation of loss tangent of aluminum oxide, silicon dioxide, and silicon nitride as a function of temperature for a plurality of microwave frequencies.

Many ceramic materials commonly used for the ceramic reactor 22 (such as for insulation or high-temperature combustor components) may exhibit high transmission within the range of microwave frequencies of the various embodiments of the present invention. To account for such high transmission, Beer's law may be used to describe the loss of power due to absorption of an electromagnetic wave traveling through a medium:

$$P(z) = P_0 e^{-k\delta z} \quad \text{Equation 6}$$

where k is the wavenumber for the electromagnetic wave in the medium and δ is the argument of a loss tangent, which is a ratio of the real and complex parts of the dielectric constant for the medium. The loss tangent is generally dependent on material thickness, microwave frequency, metallic content, and temperature. FIG. 2 graphically illustrates the effect of temperature on the loss tangent of alumina, silicon nitride, and silicon dioxide in order to demonstrate a degree to which temperature may affect microwave penetration for ceramics.

If the loss tangent is small, then a small angle approximation allows δ to be taken as approximately equal to the loss tangent. Thus, the details of FIG. 2 with Equation 6 suggest that power loss will increase with increasing temperature. For example, for sintered alumina at 35 GHz microwave frequency, Equation 6 provides that 1% power will be lost at 296 K (room temperature) and 5% power will be lost at 1273 K for a traversed length of 1 cm within alumina. However, FIG. 3 graphically illustrates that the loss tangent is smaller for lower frequencies; thus, the absorption loss would also be smaller. As a result, and while Beer's law describes absorption loss, power loss may also come from reflection and transmission considerations of the incident microwave radiation (which depends on an index of refraction and geometry of the material). For example, for 10 GHz microwave radiation incident on a plane of alumina at room temperature, according to Fresnel's equations, would result in about 25% of the signal being reflected at an air-alumina interface.

Figure 3:
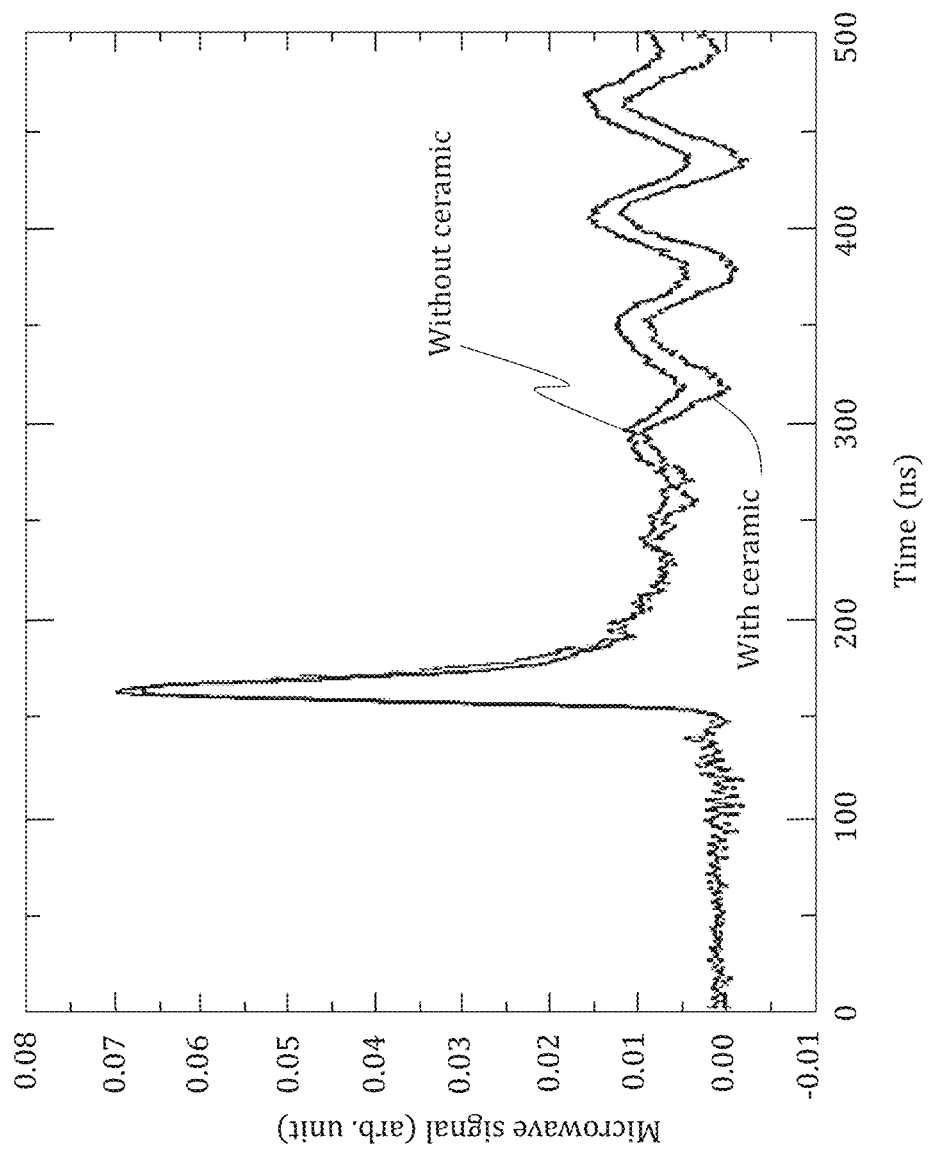
FIG. 3 is a graphical representation of microwave signal loss during a transparency test of 0.5 inch thick alumina ceramic used in a flow reactor, such as is illustrated in FIG. 1.

The detected microwave scatter through a 0.5 inch thick sample of the alumina ceramic used in the ceramic reactor 22 is shown in FIG. 3. For comparison, a single-shot microwave scattering signal is also shown without the ceramic material between the transmitter/receiver and the ionization volume. A decrease in microwave scattering of less than 10% was observed for the 0.5 inch thick sample and increases to about 30% for a thickness of 2 inches. While only alumina is illustrated here, transmission will vary for other ceramic materials because of variations in their dielectric constants as previously noted.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

A reactor 22, similar to the embodiment illustrated in FIG. 1, was constructed and included a fused-silica cylinder having an inner diameter of 23.4 mm, a length of 500 mm, and polished windows on each end. Two cylindrical heating components provided stable resistive heating sources for the flow reactor using a helically wound wire embedded in high purity alumina ceramic fiber insulation (only one heater 30 is visible in FIG. 1). The heating component 30 temperature was set at 675 K with fluctuations of less than 1 K.

Air having a temperature of 298 K radially entered the reactor 20 by way of the reactant inlet 28, was heated by convection, and radially exited the flow reactor (flow being from right to left). A laser beam 36 propagated in a direction that opposed the air flow direction (thus, from left to right). Air flow rate was set at 2 standard liters per minute ("SLPM") and was simulated under laminar conditions.

Temperature was measured at six axial positions, which are illustrated on the simulation, and which correspond to distances from an entrance window 42: 215.9 mm, 190.5 mm, 165.1 mm, 139.7 mm, 114.3 mm, and 63.5 mm. A computed variation between adjacent positions was about 20 K. These positions were selected to test the temperature sensitivity of the technique within 20 K, which is comparable to temperature differences of interest in chemical flow reactors.

Temperature measurements were also performed in a radial direction at axial position 2 so as to test sensitivity of spatial resolution for capturing temperature gradients.

Measured positions was changed in both the axial and radial directions by moving the focusing lens 38 to ensure a consistent optical geometry.

During the experiment, the microwave frequency was about 10 GHz, but was adjusted to maximize the signal prior to each data collection. Because microwave radiation at 10 GHz is only slightly attenuated by $SiO_2$, the microwave transmission and detection was performed through the ceramic reactor 22 without the need for optical accessibility. This significantly reduces experimental complexities associated with windows in combustion environments and minimizes heat loss in the reactor 22.

Figure 4:
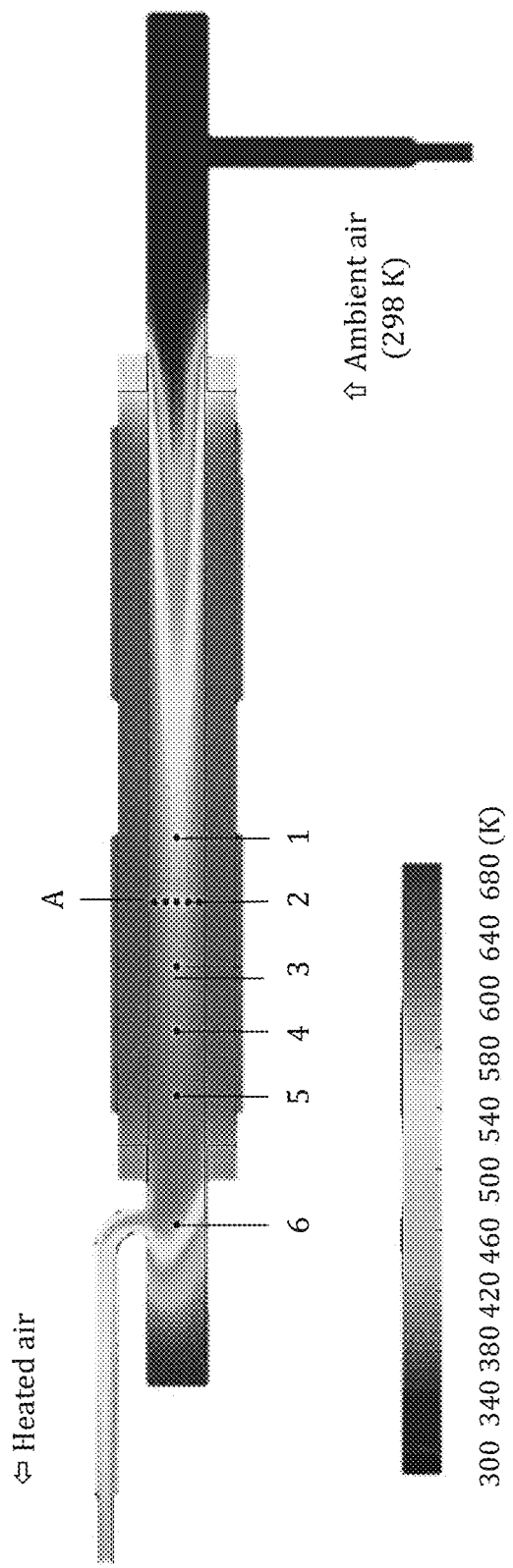
FIG. 4 is a schematic representation of computational results of a flow reactor, similar to that of FIG. 1, heated by a cylindrical heater, with positions of temperature measurements marked along the axial and radial directions.

A numerical simulation of the system was also performed and temperature distribution of the flow reactor was prepared using Pro-E software. Consistent with measurements by the thermocouples 32, 34 on the quartz flow reactor, the heating components 30 were modeled with constant temperature boundary conditions of 675 K. Results are illustrated in FIG. 4.

Figure 5:
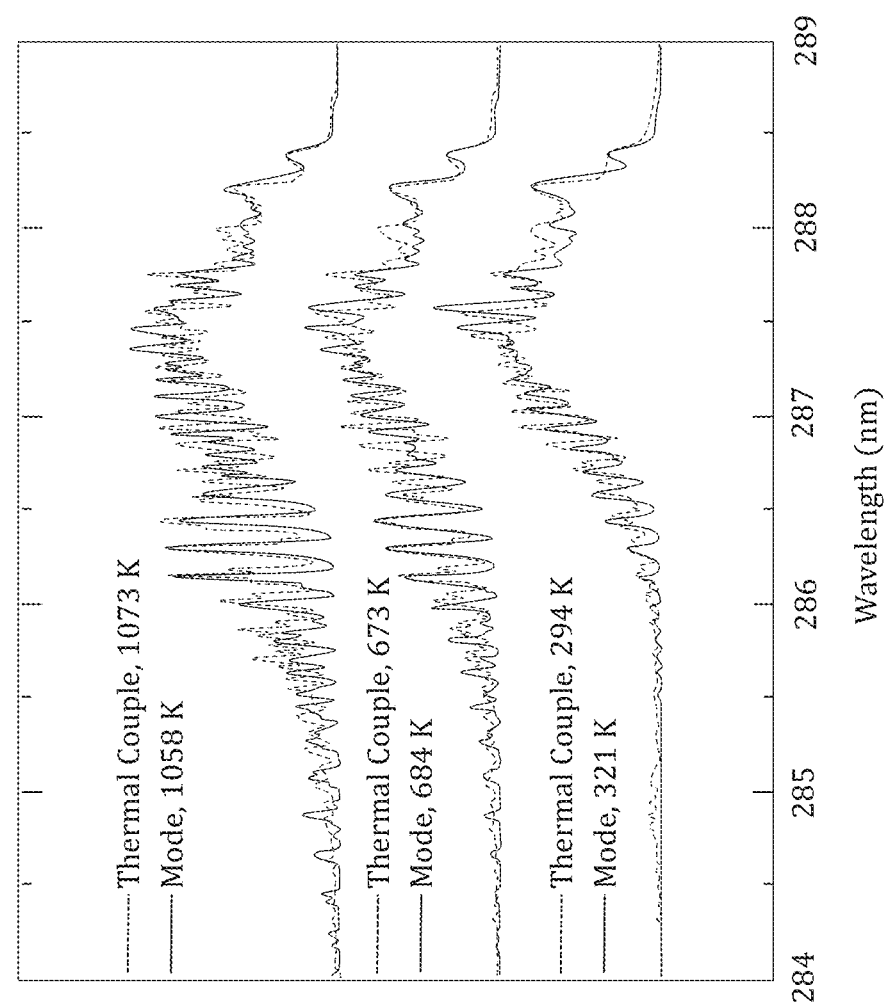
FIG. 5 is a graphical representation of experimental and modeled spectra of molecular oxygen at room temperature and at elevated temperatures.

Experimental Radar REMPI spectra of molecular oxygen in the reactor 22 are shown in FIG. 5 ranging from about 300 K to about 1100 K. Each spectrum was acquired by scanning the excitation wavelength of the ionization laser and recording the magnitude of the scattered microwave signal. Each point in the spectrum is the average of 20 laser shots. Transmission and detection of the microwave signal through the ceramic flow reactor 22 may impact the REMPI spectrum in two ways: (1) biasing the spectral shape because of frequency-dependent microwave transmission, and (2) increasing noise because of reduced signal transmission. The first issue is addressed by optimizing the microwave frequency for transmission to account for material thickness and geometry, and then maintaining a constant frequency between 9 GHz and 11 GHz. This ensures that the spectrum remains unbiased from frequency-dependent variations in transmission. The second issue is addressed by increasing the number of laser shots acquired at a given point in the spectrum. Qualitatively, the experimental and model spectra shown in FIG. 5 agree well with no systematic bias observed because of detection through the ceramic flow reactor. Although some minor discrepancies exist between the experimental and model spectra, the evaluated temperatures are within 27 K of the steady-state thermocouple measurements from about 300 K to about 1100 K (less than a 10% difference).

Example 2

Figure 6:
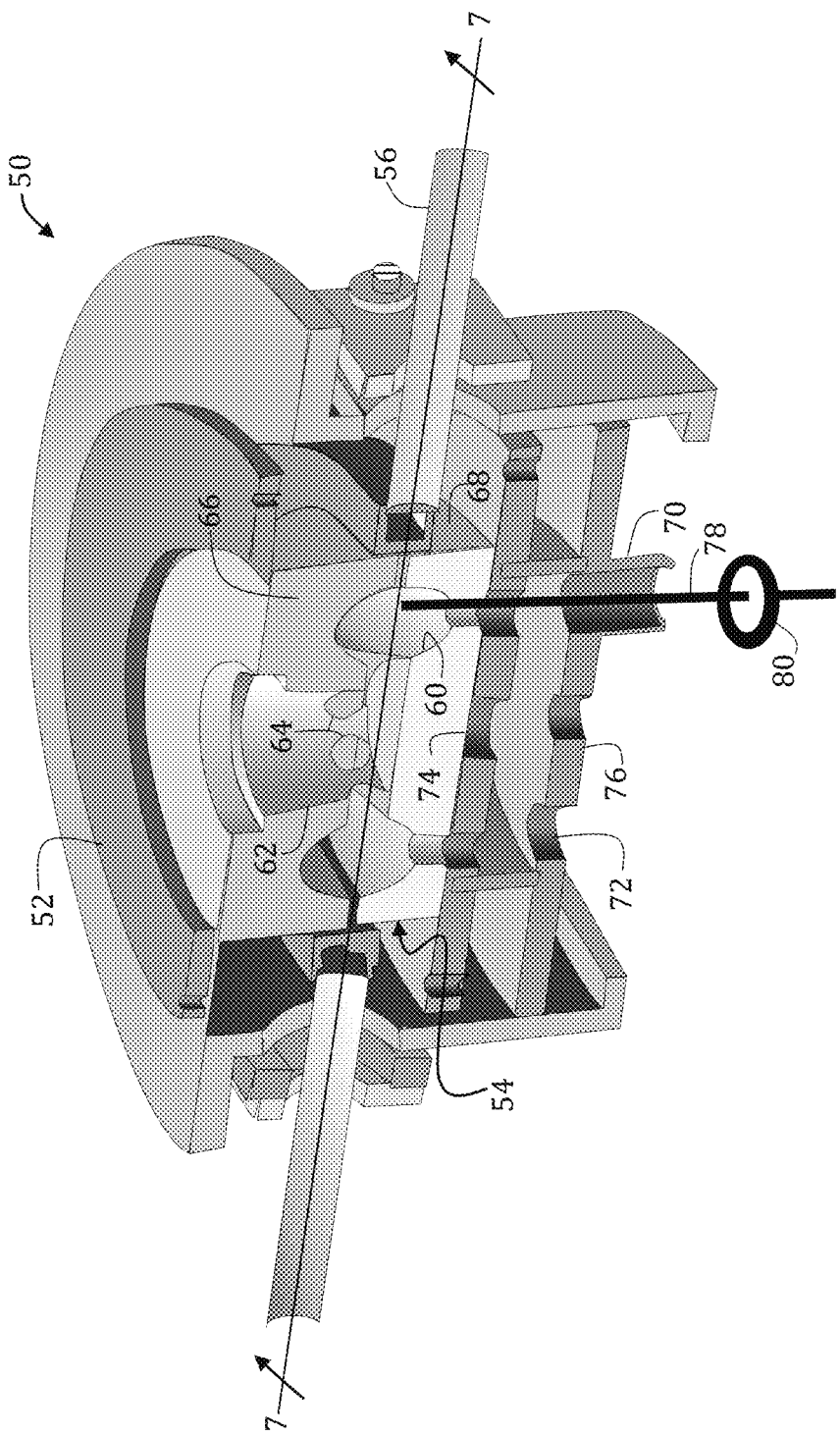
FIG. 6 is a perspective, in cross-section, of a well-stirred reactor suitable for use with a radar-based REMPI temperature measurement system according to an embodiment of the present invention.
Figure 7:
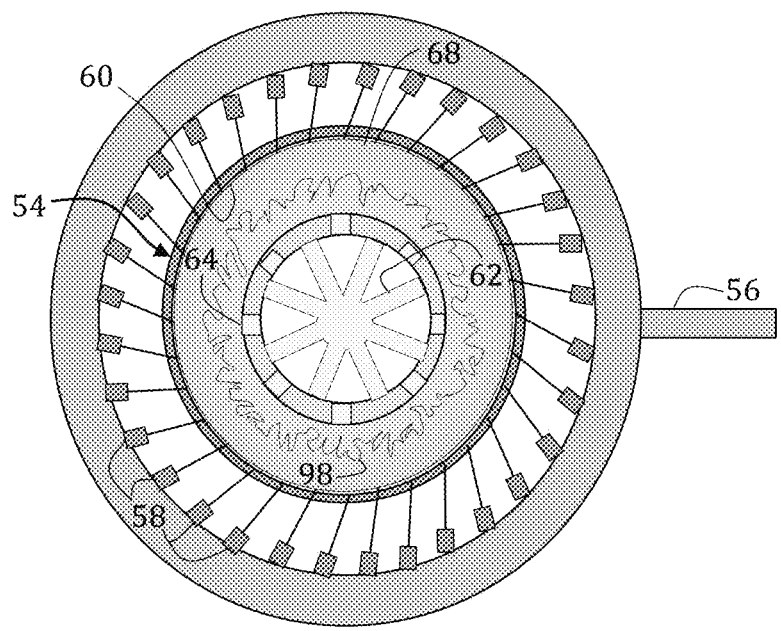
FIG. 7 is a cross-sectional view of the well-stirred reactor of FIG. 6, taken along the line 7-7 in FIG. 6.
Figure 8:
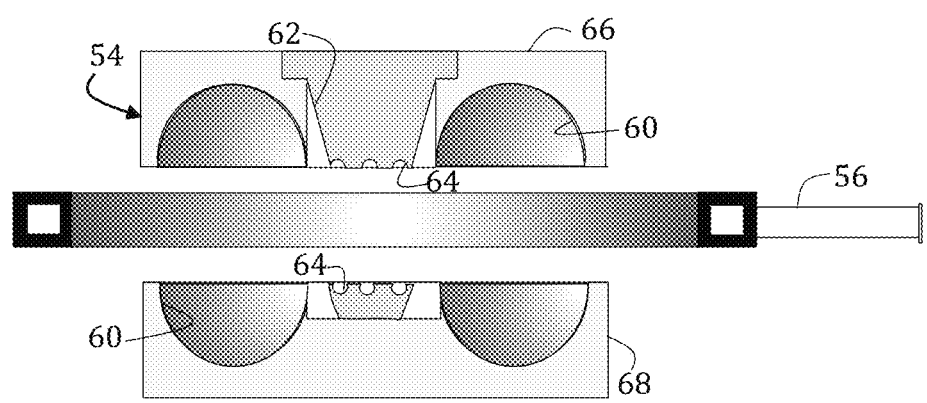
FIG. 8 is a cross-sectional view of the well-stirred reactor of FIG. 6, taken along the same plane as the perspective view of FIG. 6.

Conventional, well-stirred reactors ("WSR") 50, an example of which is illustrated in FIGS. 6-8, have been used for quantifying combustion emissions and lean and rich blowoff limits of conventional, alternative, and surrogate fuels. The WSR 50 may general include a metal housing 52 about the WSR 50. The WSR 50 comprises a jet ring manifold 54, a fuel-air tube 56, and a plurality of needle jets 58 configured to direct fuel, gas, or both into a toroidal reactor 60. A flow straightener 62 may be centrally-disposed within the toroidal reactor 60 with one or more exhaust ports 64 extending from the flow straightener 62. First and second portions 66, 68 (illustrated as upper and lower portions, respectively) of the toroidal reactor 60 were constructed from silicon dioxide (Rescor 750) and $SiO_2$ and were clamped together using the manifold 54. Two access ports 70. 72, separated by 180° along a bottom wall 74 of the toroidal reactor 60 and a bottom wall 76 of the WSR 50 were used for introducing a thermocouple (not shown) and a laser beam 78 into the WSR 50. The optical access port 70 may be covered by a quartz window (not shown) at the metal housing 52 while the thermocouple port 72 may be otherwise completely sealed. The thermocouple may be moveable, vertically for example, with respect to vertically within the toroidal reactor 60 in conjunction with a radar REMPI focusing lens 80 to provide temperature values at the same height for comparison of the two temperature measurement techniques.

Briefly, and in use, vaporized liquid or gaseous fuels are premixed with air in the jet ring manifold. To ensure all fuel is vaporized, and to minimize potential thermal decomposition of the fuel before combustion in the reactor 50, the temperature of the mixture is held at about 505 K. The mixture is injected into the toroidal reactor 60 through the plurality of 1 mm diameter jets 58 with a Mach number of about 0.8. A bulk residence time for non-reacting flow is about 28 ms and about 6 ms when the reactor 50 is operating because of gas expansion.

The WSR 50 has been used for measuring ignition probability as a function of residence time and equivalence ratio. In this case, the temperature profile in the WSR 50 before ignition is a critical initial boundary condition for the ignition process. While measurement of the temperature profile may be made by physically scanning a Type-K thermocouple across a diameter of the toroidal reactor 60, the physical probe may perturb the flow and, therefore, the temperature profile. Additionally, thermocouple will measure total temperature of the flow which will deviate from the static temperature of the flow near the middle of the toroidal reactor 60 because of the inlet jets 58. Accurate, non-invasive measurement of the static temperature distribution is critical for providing high-fidelity boundary conditions for modeling of ignition events in the WSR 50.

Figure 9:
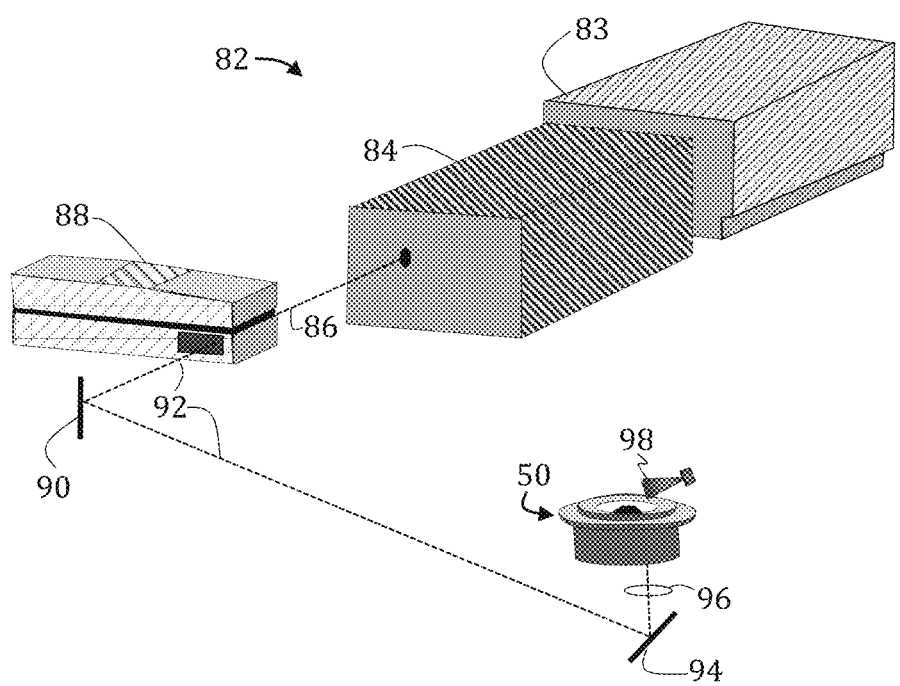
FIG. 9 is a perspective view of an experimental set for testing a temperature within a well-stirred reactor using a radar REMPI system according to an embodiment of the present invention.
Figure 10A:
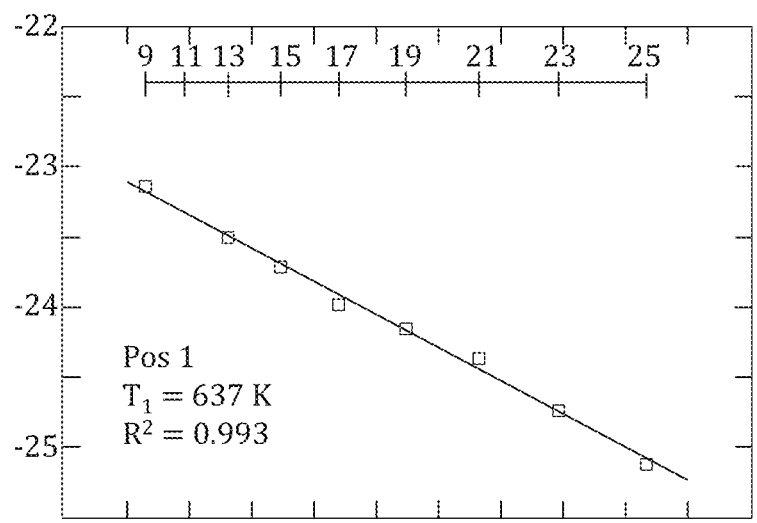
FIGS. 10A-10F are graphical representations of Boltzmann plots for oxygen temperature determination by rotational lines of $S_{21}$ (J"=9-25) along six test points arranged in an axial direction.
Figure 10B:
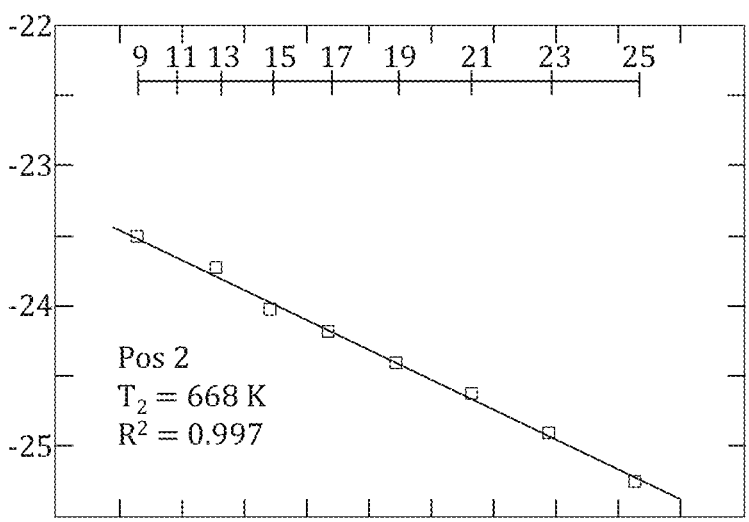
Figure 10C:
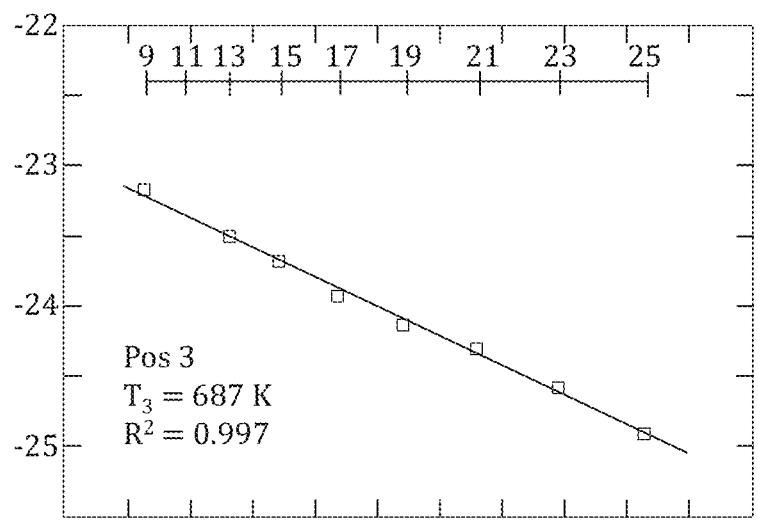
Figure 10D:
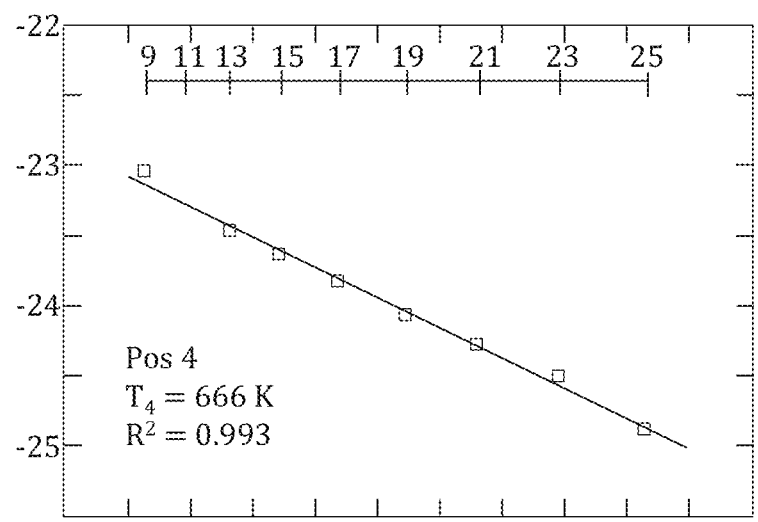
Figure 10E:
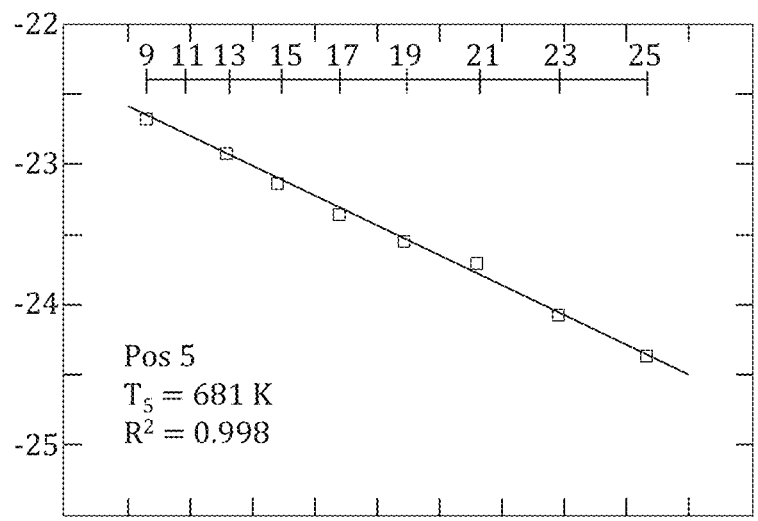
Figure 10F:
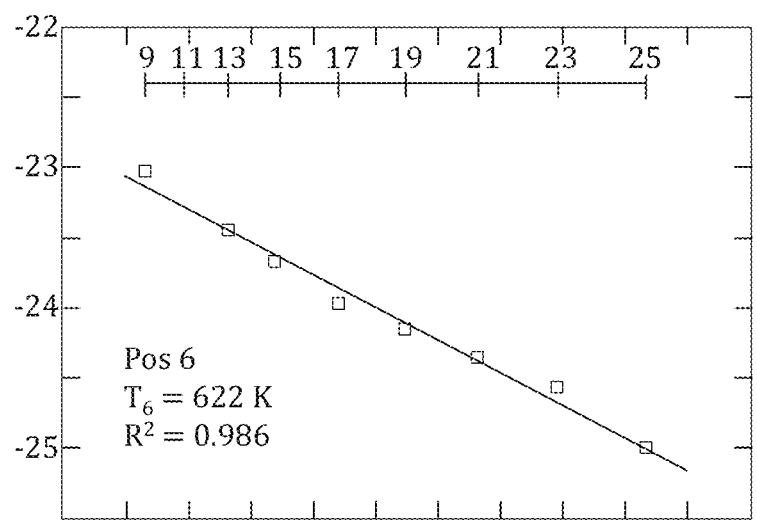

For this proof-of-principle, a radar REMPI system 82 according to an embodiment of the present invention was used to measure the temperature profile in the WSR 50 for constant temperature inlet conditions. The measurement setup is shown in FIG. 9 and included a Nd:YAG laser 83 (Spectra Physics Pro-290) operating at a wavelength of 532 nm, which was used to pump a Sirah dye laser 84 (PRSC-D-24). The beam 86 emitted by the Sirah dye laser was frequency doubled, and the pulse energy was automatically tracked and optimized using a Continuum UVT 88. The input wavelengths for the measurements were automatically scanned between 276 nm and 287 nm at a rate of 0.02 nm/s. A first mirror 90 guided the doubled laser beam 92 toward a bottom of the WSR 50 where the laser beam 92 was then directed upwardly by a second mirror 94. Before entering the WSR, a positive 100 mm spherical focusing lens 96 was used to focus the upwardly-directed laser beam 92 through a fused silica window (not shown). The focused laser beam generated a REMPI plasma 98 (FIG. 7) inside the toroidal reactor 60 (FIG. 7) through multiphoton ionization of $O_2$. The focusing lens 96 was moved vertically by a translation stage (not shown) so that measurements could be taken at multiple positions within the toroidal reactor 60 (FIG. 7).

Accordingly, the WSR 50 was heated, exclusively, by flowing heated air through the system. Fuel was not used in the characterization experiments.

Data collection via a microwave horn 98 commenced once the system was near thermal equilibrium, as measured by a type-B thermocouple (not shown). The WSR 50 was operated with an air flow rate of 500 SLPM and an inflowing air temperature of 477 K. The temperature of the WSR 50, at thermal equilibrium, was about 450 K.

FIGS. 10A-10F graphically illustrate experimental Boltzmann plots of the $S_{21}$ branch of the rotational molecular oxygen spectra corresponding to six axial positions of testing (similar to what is shown in FIG. 4). Excellent fits ($R^2 \sim 99\%$) were achieved for all six locations. $S_{21}(11)$ has been omitted due to relative low temperature sensitivity. The corresponding temperatures calculated from the slope of the Boltzmann plots are listed in the respective figure.

Figure 11A:
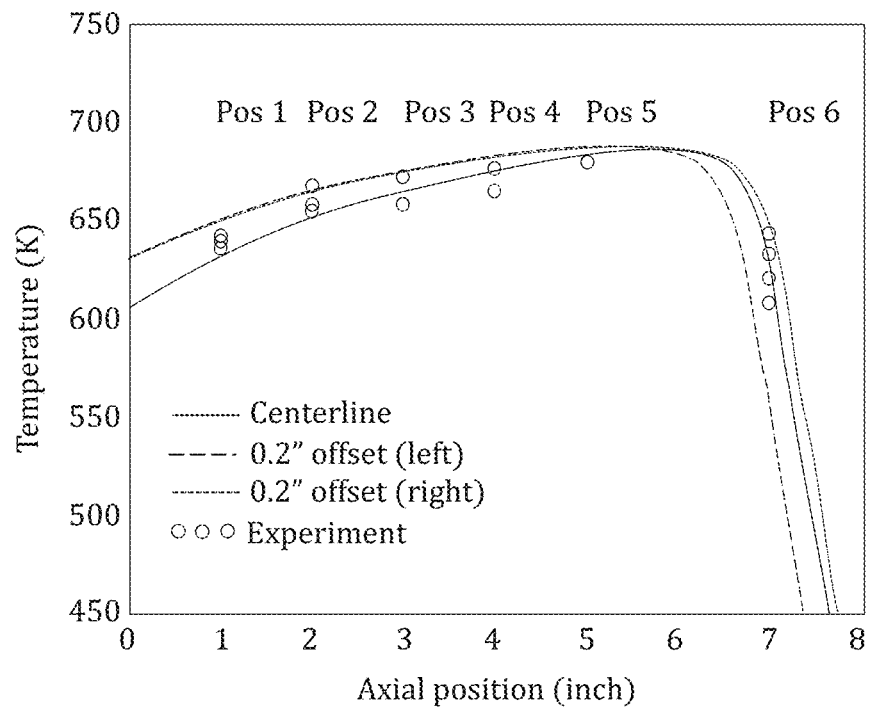
FIGS. 11A and 11B are graphical representations of spatial distributions of molecular oxygen rotational temperature in the flow reactor, in the axial and radial directions, respectively.
Figure 11B:
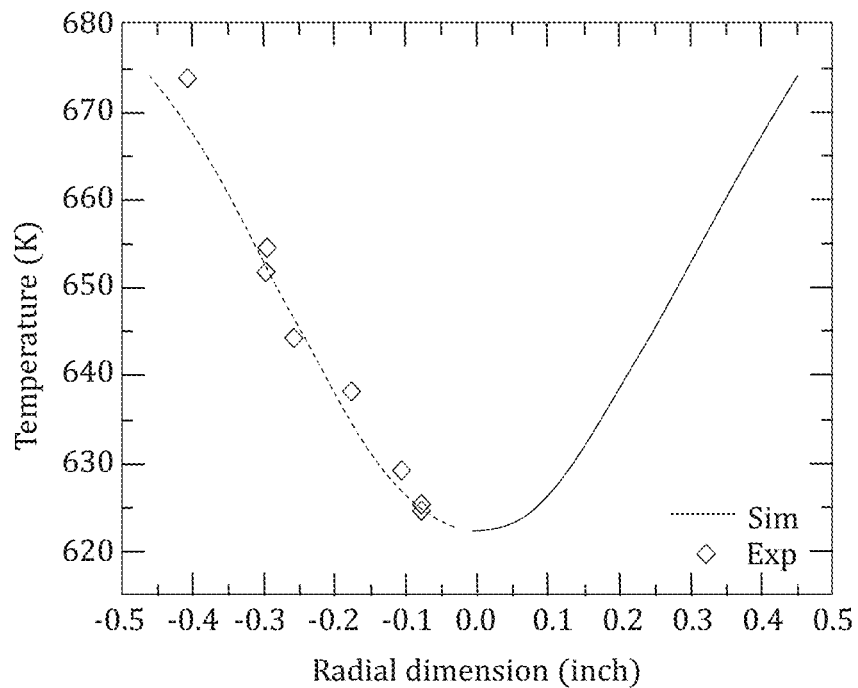
Figure 12A:
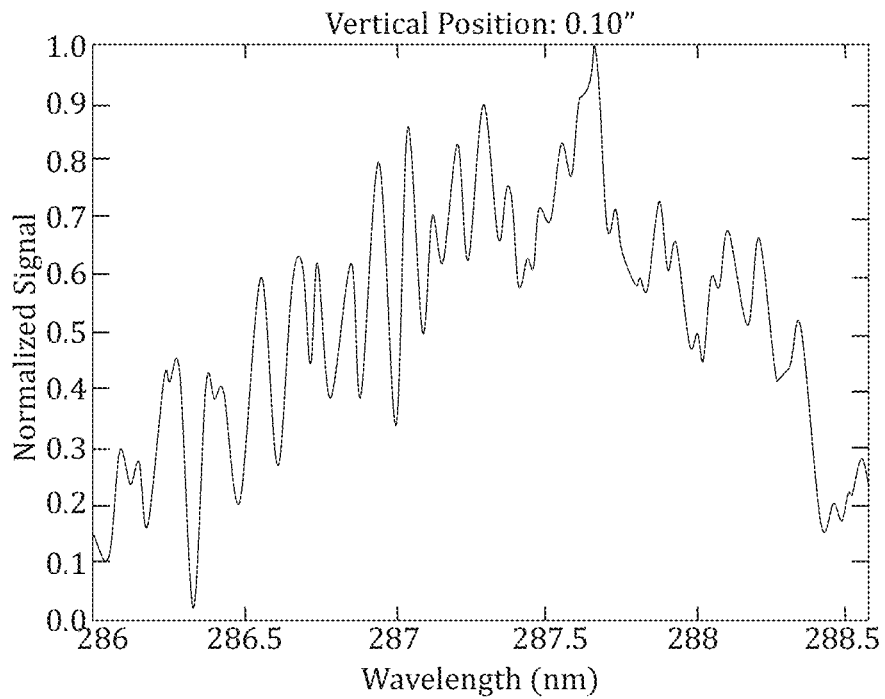
FIGS. 12A-12E are graphical representations of normalized REMPI spectra of molecular oxygen at various heights within the well-stirred reactor.
Figure 12B:
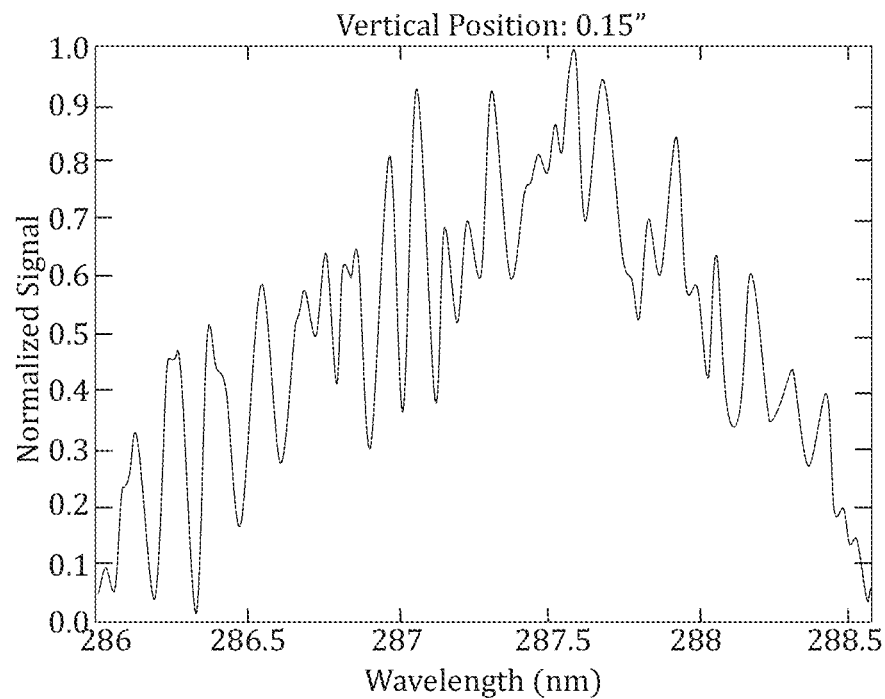
Figure 12C:
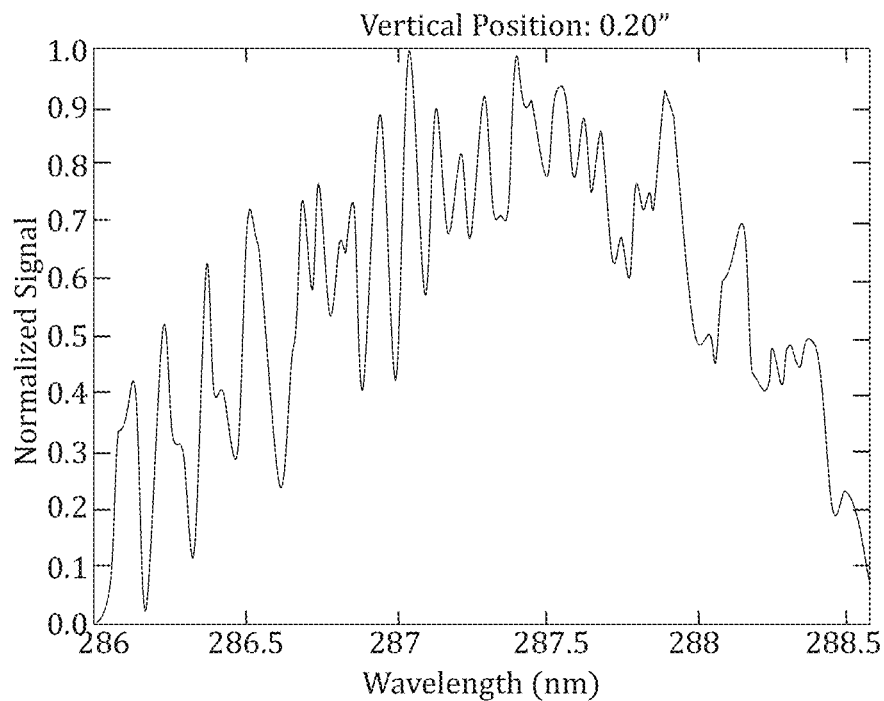
Figure 12D:
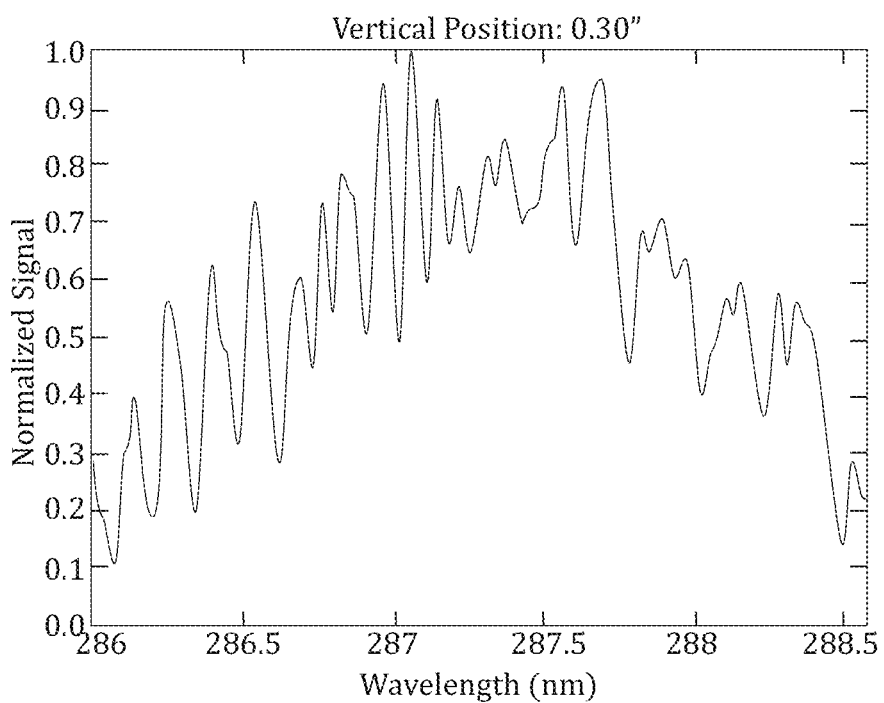
Figure 12E:
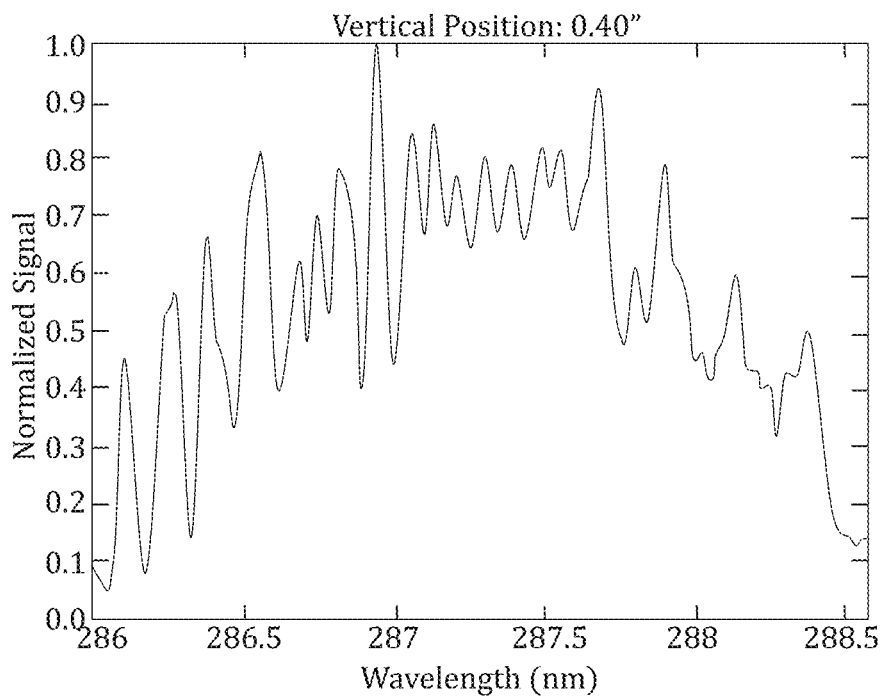
Figure 13A:
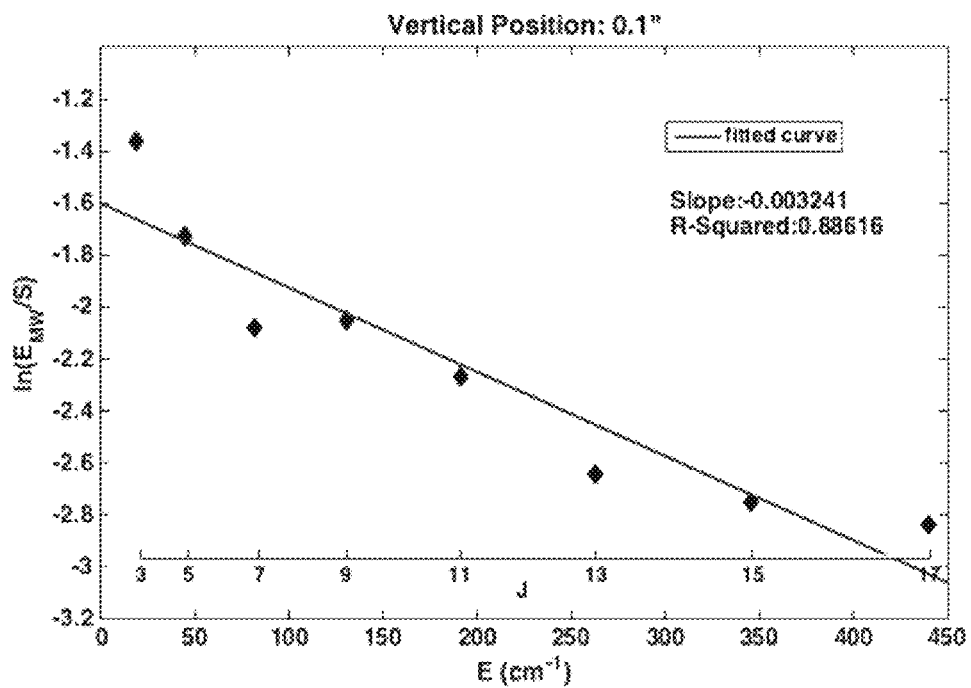
FIGS. 13A-13E are graphical representations of Boltzmann plots of molecular oxygen REMPI spectra at various heights within the well-stirred reactor.
Figure 13B:
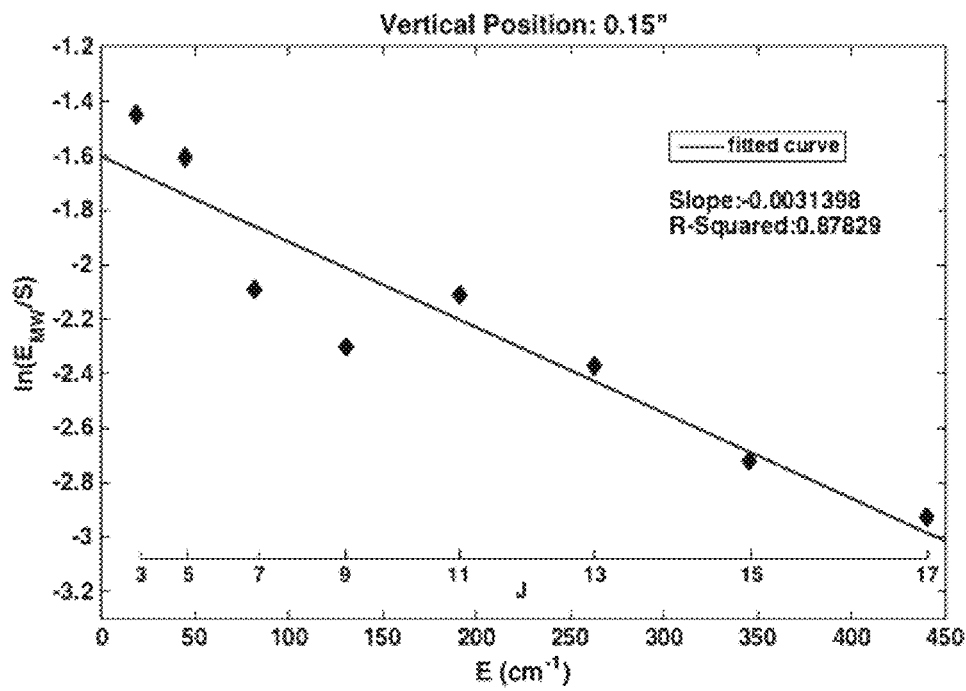
Figure 13C:
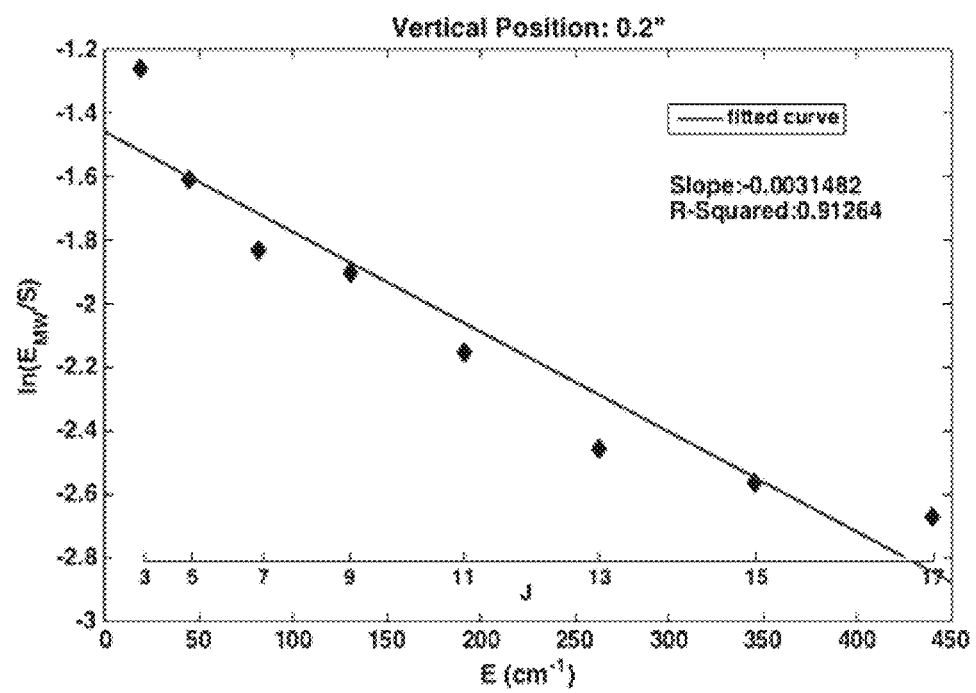
Figure 13D:
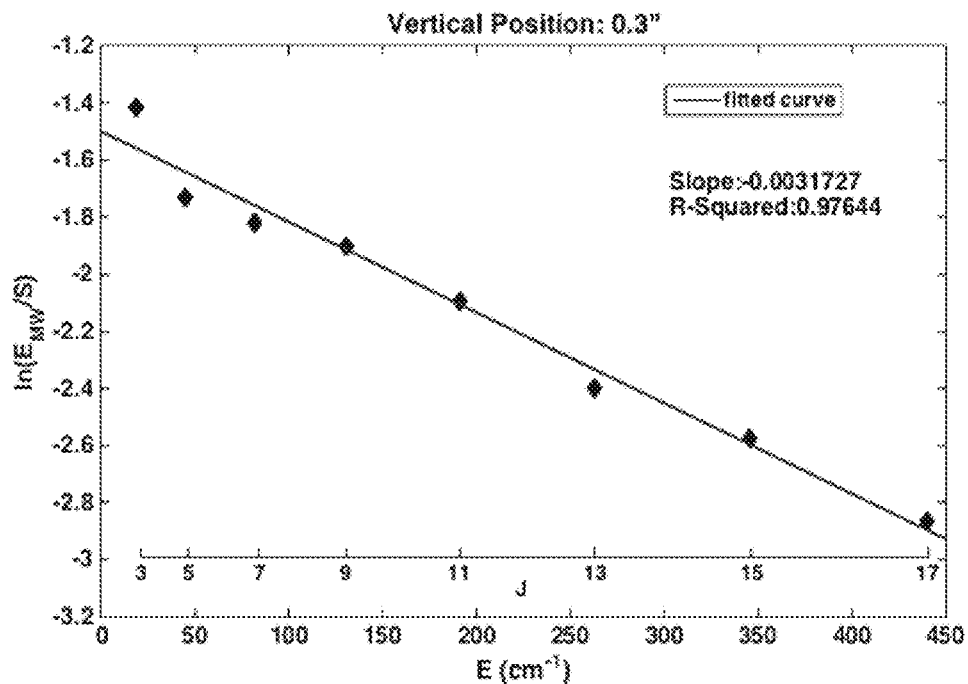
Figure 13E:
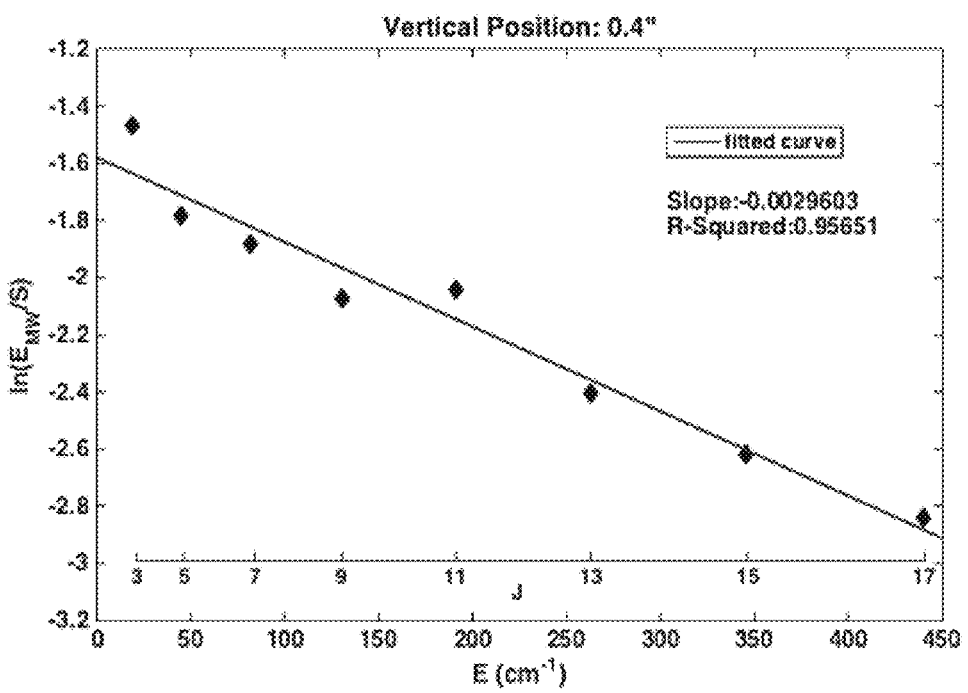

The computed temperatures are plotted as stars in FIG. 11A for an axial direction and in FIG. 11B for a radial direction. The solid and dashed lines in FIGS. 11A and 11B are results using a computational heat transfer model in Solidworks Flow Simulation module. Heat conduction, convection, and radiation between solids and air were considered in the simulation with applied adiabatic boundary conditions between the system and the environment. The solid line is the computed temperature distribution along a centerline of the flow reactor and indicates the existence of a small temperature gradient (about 0.5 K/mm). The dashed and dotted lines are the computed temperatures at ±0.2 in offsets from the centerline, left and right, respectively.

Overall, the see-through-wall radar REMPI temperature measurements agreed well with simulated results near an inner surface of the toroidal reactor. At positions closer to the surface of the system, the air temperature (heated by surface conduction and radiation) reached the temperature set point of 675 K. However, at positions near the center of the toroidal reactor, only convection plays a significant role to the heating of air. As a result, the air temperature at the positions near the center of the toroidal reactor were lower than those measured at the surface. This temperature distribution is captured by both the simulation and experimental measurements.

The see-through-wall radar REMPI temperature measurements also agreed very well with the simulated results and exhibited absolute differences of less than 5 K. FIG. 11B highlights the sub-millimeter spatial resolution of the radar REMPI technique. Such resolution is sufficient to capture the about 5 K/mm gradient in the radial direction.

FIGS. 12A-12E graphically illustrate normalized (by maximum observed signal) REMPI spectra of molecular oxygen at various heights within the WSR. Each spectrum was averaged over two scans to achieve better SNR. The baselines of the all spectra were obtained at off-resonant wavelengths.

Fairly consistent spectral measurements were obtained for positions in a lower half of the toroidal reactor. Accurate measurements were not achieved in an upper half of the toroidal reactor because of competition between (1) limited optical focal lengths required to avoid breakdown on the upper wall in the toroid and (2) stronger signal of molecular oxygen plasma in the WSR. Breakdown was identified as an abnormal increase in a few points of the spectra, which essentially sets the limits of the focusing lens and laser energy. No ceramic ablation was observed on the WSR after measurements, indicating the breakdown was entirely due to interactions with the heated air.

FIGS. 13A-13E graphically illustrate Boltzmann plots of molecular oxygen REMPI spectra at various heights within the WSR. Microwave signals at various $S_{21}$ rotational branches of molecular oxygen were identified from corresponding ones of FIGS. 12A-12E. The line position of $S_{21}$ branches is the x-axis.

Normalized signal by rotational line strength and laser intensity is shown as the y-axis in each of FIGS. 13A-13E. Data was linearly fit and yielded rotational temperature, as given in Equation 5. Sufficient linear fits were achieved with $R^2$ at about 0.9.

During the experiment, the signal-to-noise ratio increased with height of measurement within the flow reactor. Such correlation is reflected in FIGS. 13A-13E by the generally better $R^2$ values for vertical positions 0.3 in and 0.4 in as compared to other measured positions. The correlations may be due to less absorption of the microwave scattering by the lower wall. While increasing the absorption of the microwave scatter reduces the overall signal strength, the relative features of the spectra remained unchanged.

Figure 14:
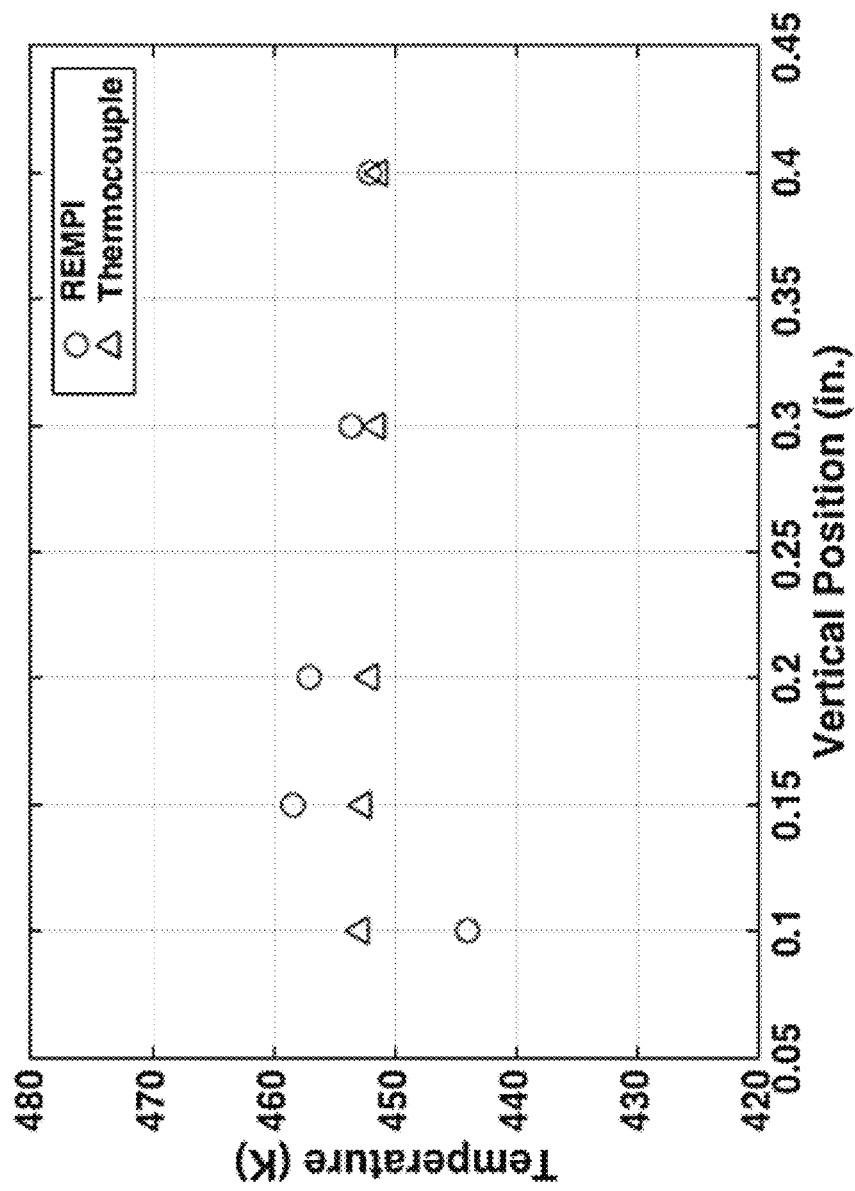
FIG. 14 is a graphical representation of comparisons of temperatures obtain from REMPI spectra and from thermocouple measurements.

The comparison of temperatures obtained from the radar REMPI and thermocouple measurements is summarized in Table 2 and plotted in FIG. 14. Agreement between the radar REMPI measurement values for the temperature and thermocouple measurements is quite good with difference of less than 2%, and generally becomes better for increasing height, which may reflect the increasing signal to noise ratio with increasing height. However, a substantial temperature gradient is expected near the wall which is not captured by the thermocouple measurements but may be indicated by the rapid decrease in temperature at 0.1 in as measured using radar REMPI. Also, while a relatively flat profile is measured by the thermocouple, the radar REMPI measurements indicate a possible decrease in temperature towards the middle of the reactor which would be consistent with the decrease in static temperature associated with the Mach 0.8 jets along the centerline. This would not be expected to have an impact on the thermocouple measurements since they measure total temperature, not static temperature.

TABLE 2

| Vertical Position (in) | $T_{REMPI}$ (K) | $T_{Thermocouple}$ (K) | % Difference |
|---|---|---|---|
| 0.1 | 444.0 | 452.7 | 1.9 |
| 0.15 | 458.3 | 452.5 | 1.3 |
| 0.2 | 457.0 | 452.1 | 1.1 |
| 0.3 | 453.5 | 451.5 | 0.4 |
| 0.4 | 452.1 | 451.3 | 0.2 |

Embodiments of the present invention, as describe herein, are directed to devices and methods of coherent microwave scattering from REMPI for rotational temperature measurements through ceramic-walled reactors. Through limited single-ended optical access, a laser beam is focused to generate local ionization of molecular oxygen within a ceramic reactor or combustor. Coherent microwave scattering from the laser-induced plasma, which is transmitted and received through the ceramic walls, is used to acquire rotational spectra of molecular oxygen and determine temperature. Temperature measurements with an accuracy of ±20 K (±3%) may be achieved in operating reactors. Methods according to the various embodiments therein enable non-invasive, high-fidelity quantification of spatially localized temperature in confined reactors and combustors constructed of ceramic materials in which limited or non-existing optical access hinders usage of conventional optical diagnostic measurement techniques. Such methods may be used to improve temperature measurement quality and fidelity in chemical flow reactors, gas-turbine combustors utilizing ceramic composites, and industrial ceramic air heaters.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of measuring a temperature of a thermally-insulated, high temperature system, the method comprising:
   directing a first electromagnetic energy into the high temperature system, the first electromagnetic energy being configured to cause multi-photon ionization of a molecular or atomic species;
   detecting, through a thermally-insulated wall of the high temperature system, a second electromagnetic energy resulting from the multi-photon ionization of the molecular or atomic species within the high temperature system; and relating the detected second electromagnetic energy to a temperature within the high temperature system.

2. The method of claim 1, wherein detecting the second electromagnetic energy includes a microwave detection system.

3. The method of claim 1, wherein the molecular or atomic species is molecular nitrogen gas, molecular oxygen gas, or nitric oxide gas.

4. The method of claim 1, further comprising:
focusing the first electromagnetic energy to a desired position within the high temperature system.

5. The method of claim 1, wherein the first electromagnetic energy is an ultraviolet light.

6. The method of claim 5, wherein directing the first electromagnetic energy includes directing the ultraviolet light through an access port having a diameter less than 5 mm.

7. The method of claim 1, wherein the thermally-insulated wall comprises a ceramic or a ceramic composite.

8. The method of claim 7, wherein the ceramic or ceramic composite is aluminum oxide, silica dioxide, or silicon carbide.

9. A method of measuring a temperature of a thermally-insulated, high temperature system, the method comprising:
directing a first electromagnetic energy to a first position within the high temperature system, the first electromagnetic energy being configured to cause multi-photon ionization of a molecular or atomic species;
detecting, through a thermally-insulated wall of the high temperature system, a second electromagnetic energy resulting from the multi-photon ionization of the molecular or atomic species at the first position within the high temperature system;
directing the first electromagnetic energy to a second position within the high temperature system;
detecting, through the thermally-insulated wall of the high temperature system, a third second electromagnetic energy resulting from the multi-photon ionization of the molecular or atomic species at the second position within the high temperature system; and
relating the detected second and third electromagnetic energies to a temperature within the high temperature system.

10. The method of claim 9, wherein detecting the second electromagnetic energy includes a microwave detection system.

11. The method of claim 9, wherein the molecular or atomic species is molecular nitrogen gas, molecular oxygen gas, or nitric oxide gas.

12. The method of claim 9, wherein the first electromagnetic energy is an ultraviolet light.

13. The method of claim 12, wherein directing the first electromagnetic energy includes directing the ultraviolet light through an access port having a diameter less than 5 mm.

14. The method of claim 9, wherein the thermally-insulated wall comprises a ceramic or a ceramic composite.

15. The method of claim 14, wherein the ceramic or ceramic composite is aluminum oxide, silica dioxide, or silicon carbide.

* * * * *